G. H. BECKER.
Blind-Slat Securer.
No. 222,855. Patented Dec. 23, 1879.
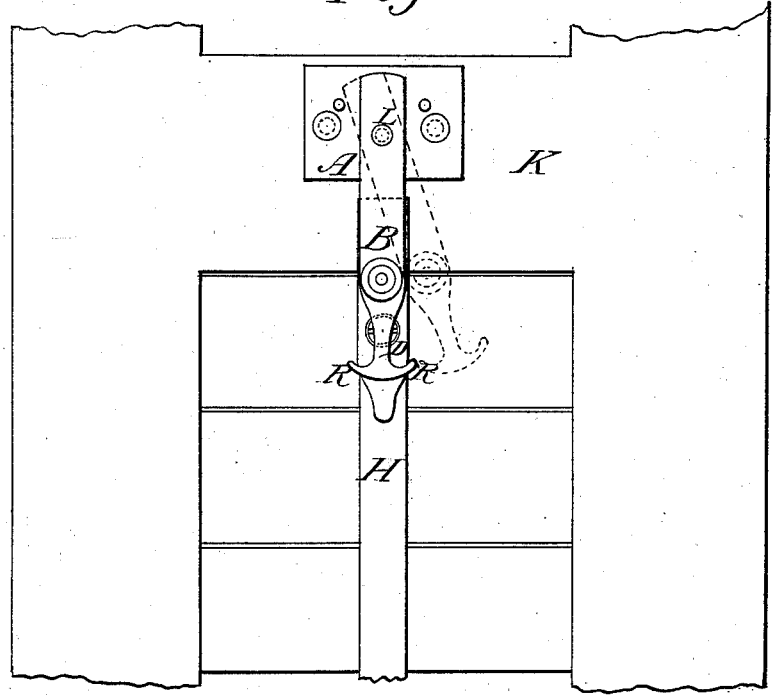
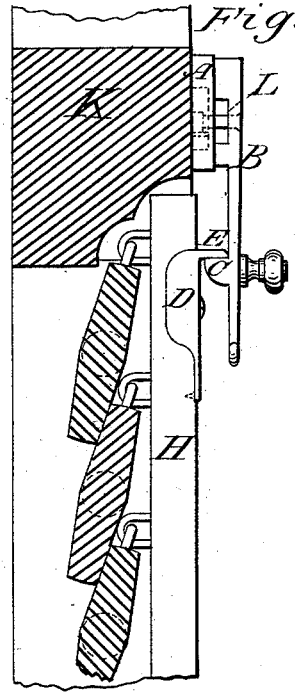
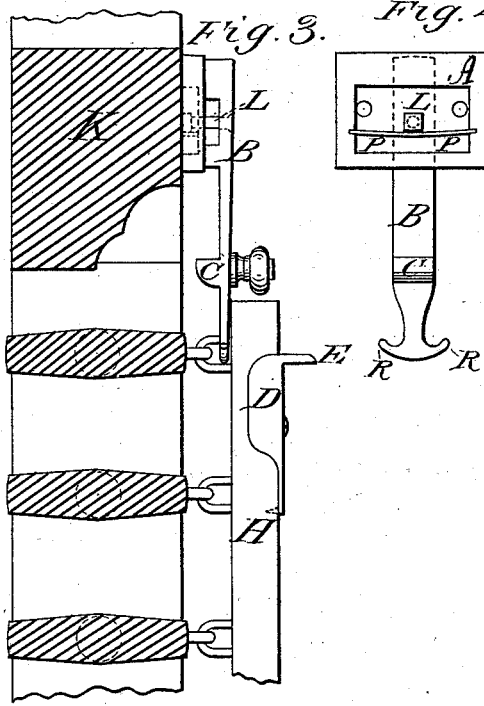
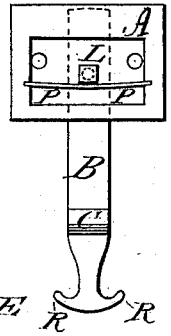
Attest:
M. H. Baldwin
Edwin Stout
Inventor
George Herman Becker

UNITED STATES PATENT OFFICE.

GEORGE H. BECKER, OF MEMPHIS, TENNESSEE.

IMPROVEMENT IN BLIND-SLAT SECURERS.

Specification forming part of Letters Patent No. 222,855, dated December 23, 1879; application filed June 17, 1879.

*To all whom it may concern:*

Be it known that I, GEORGE HERMAN BECKER, of Memphis, in the county of Shelby, State of Tennessee, have invented a new and valuable device or improvement for fastening or securing in a closed or open position the revolving slats of window-blinds; and I do hereby declare that the following is a full, clear, and exact description of the same, reference being had to the accompanying drawings, making part of this specification, together with the figures and letters marked thereon.

Figure 1 is a front view of a part of a revolving slat-blind, showing the slats closed and the device attached. Fig. 2 is a vertical cross-section of blind, showing a side view of the same. Fig. 3 is a section showing the slat open and secured in that position by the device. Fig. 4 is an inside view of the same.

The device is securely fastened to the upper cross-rail of the blind K, Figs. 1 and 2, by screws through the plate A.

To the upper end of the sliding rod H is attached the plate D, with the hook E at the upper end.

When the slats are closed the rod H, with the catch or hook E, is raised to the position shown in Figs. 1 and 2. The bar B being turned aside, as shown by dotted lines in Fig. 1, to allow it to pass up, is then thrown back and held in a perpendicular position by the spring P working against the square head of the pin or pivot L, Fig. 4, the hook C catching in or over the catch E, and thus holding the slats securely closed.

When it is desired to fasten the slats open the lever B is turned aside and the rod H allowed to drop down to the position shown in Fig. 3. One of the hooks R on the lever B is then hooked into the upper slat-staple of the rod H, which holds it securely in that position, substantially as shown in Fig. 3.

Now, in order to enable others to construct and make the above-described revolving slat-securer, I will explain the manner of its construction.

A, as shown in Fig. 4 of drawings, is a flat plate, with a recess in the under side for the spring P, against which works the square head of the pin or pivot L, thus keeping the lever B in position.

The bar or lever B is secured to the plate A by the pin or pivot L, riveted fast in the lever B and revolving in the plate A.

The catch D is a thin plate of brass or other metal turned down at the sides to fit the rod H, the upper end turned up in the form of the hook E and secured with a screw, as shown in Fig. 1.

I make no claim to the mode of constructing my revolving slat-securer; but

I claim as my invention—

The combination of the bar B, provided with hooks C and R R and square pivot L, with spring P, hook E upon rod H, and one of the rod-staples, substantially as described.

GEORGE HERMAN BECKER.

Witnesses:
   M. H. BALDWIN,
   EDWIN STOUT.